US00RE35331E

United States Patent [19]

Sherman

[11] E Patent Number: Re. 35,331

[45] Reissued Date of Patent: Sep. 24, 1996

[54] MATERIAL SEPARATING APPARATUS

[75] Inventor: Raymond W. Sherman, Barrington, Ill.

[73] Assignee: General Kinematics Corporation, Barrington, Ill.

[21] Appl. No.: 294,961

[22] Filed: Aug. 24, 1994

Related U.S. Patent Documents

Reissue of:

[64] Patent No.: 5,108,589
Issued: Apr. 28, 1992
Appl. No.: 702,145
Filed: May 13, 1991

[51] Int. Cl.[6] ..... B07B 1/12; B07B 1/46

[52] U.S. Cl. ..... 209/393; 209/674

[58] Field of Search ..... 209/660, 674, 209/675, 680, 314, 313, 393, 311, 259, 257, 395, 676

[56] References Cited

U.S. PATENT DOCUMENTS

| | | | |
|---|---|---|---|
| 760,590 | 5/1904 | Vodra | 209/393 |
| 1,026,529 | 5/1912 | Rainforth | 209/393 X |
| 1,389,231 | 8/1921 | Walker | 209/393 |
| 1,641,777 | 9/1927 | Newhouse | 209/672 |
| 2,124,856 | 7/1938 | Kohler | 209/672 |
| 3,143,212 | 8/1964 | Miller | 209/674 X |
| 4,101,420 | 7/1978 | Luginbuhl | 209/672 |
| 4,301,930 | 11/1981 | Smith | 09/671 |
| 4,452,694 | 6/1984 | Christensen et al. | 209/672 |
| 4,538,734 | 9/1985 | Gill | 209/668 |
| 4,579,652 | 4/1986 | Bielagus | 209/271 |
| 4,653,648 | 3/1987 | Bielagus | 209/672 |

FOREIGN PATENT DOCUMENTS

| | | | |
|---|---|---|---|
| 495405 | 8/1950 | Belgium | 209/393 |
| 2633535 | 1/1990 | France | 209/675 |
| 610269 | 3/1935 | Germany | 209/393 |
| 683263 | 11/1939 | Germany | 209/393 |
| 140666 | 3/1980 | Germany | 209/674 |
| 3422148 | 12/1984 | Germany | 209/240 |
| 40361 | 3/1979 | Japan | 209/393 |
| 152983 | 7/1961 | U.S.S.R. | 209/674 |

*Primary Examiner*—David H. Bollinger
*Attorney, Agent, or Firm*—Wood, Phillips, VanSanten, Clark & Mortimer

[57] ABSTRACT

A material separating apparatus for separating particles up to a preselected size from a material having particles of different sizes therein includes a trough having a material input longitudinally spaced from a material discharge end. The apparatus also includes a separator having a plurality of longitudinally spaced finger screen sections between the input end and the discharge end and along the longitudinal axis of the trough. The finger screen sections each have a backbone extending from side to side across the width of the trough and also each have forwardly extending fingers connected at one end to the backbone. The fingers are spaced side by side from each other by a preselected amount at forward ends thereof sufficient to allow particles up to the preselected size to pass through the fingers as the trough is vibrated to cause the material to move from the input end to the discharge end. The finger screen devices also each have the forward ends of the fingers thereof overlapping the next forwardly adjacent finger screen device and include a rearwardly depending leg connected at one end to the backbone thereof. The apparatus further includes the forward ends of the fingers being vertically spaced above the next forwardly adjacent finger screen device by an amount equal to the preselected amount of spacing therebetween. With this arrangement, the material is conveyed along the trough and over successive ones of the finger screen sections with particles up to the preselected size falling through the finger screen as the material moves from the input end to the discharge end of the trough.

21 Claims, 4 Drawing Sheets

MATERIAL SEPARATING APPARATUS

Matter enclosed in heavy brackets [ ] appears in the original patent but forms no part of this reissue specification; matter printed in italics indicates the additions made by reissue.

FIELD OF THE INVENTION

The present invention generally relates to a material separating apparatus and, more particularly, to an apparatus for separating particles up to a preselected size from a material having particles of different sizes therein.

BACKGROUND OF THE INVENTION

Many separating devices employ a screen over which material is moved so that the smaller particles may pass through the screen while the larger particles pass therealong. Such screens are often subject to excessive wear and are subject to damage due to the clogging of the screen by the particles themselves. Furthermore, the material must often be recirculated over the screen in order to effectively filter out a high ratio of particles of the size attempted to be separated therefrom.

To overcome this problem, a separator with a plurality of screens, preferably inclined and overlying each other in series, was proposed in U.S. Pat. No. 3,232,431. While highly satisfactory for its intended purpose, there has remained a need for material separating or classifying apparatus for difficult materials which would catch in typical wire mesh or perforated screen type devices. Specifically, there are a number of difficult materials that are not readily separable by any apparatus that is presently commercially available.

In this connection, it would be desirable to be able to classify or separate such materials in a continuous process. Among the materials to which this would apply, and by way of example only, is shredded auto scrap residue, building demolition materials, wood refuse including bark, municipal solid wastes, solid-fluid mixtures, biomass fuels. and the like. For all such materials, the apparatus should be non-bending, self-relieving, and stay clean without "porcupining."

The present invention is directed to overcoming the above stated problems and accomplishing the stated objects by providing a unique material separating apparatus.

SUMMARY OF THE INVENTION

Accordingly, the present invention is used in a material separating apparatus for separating particles of different sizes from a material. The apparatus in which the invention is used includes a trough having a material input end longitudinally spaced from a material discharge end together with means for separating particles up to the preselected size from a material having particles of different sizes therein. The separating means includes in plurality of longitudinally spaced finger screen means disposed between the input end and the discharge end and along the longitudinal axis of the trough. Each of the finger screen means includes a backbone extending from side to side across the width of the trough and also includes forwardly extending fingers connected at one end to the backbone. The fingers are spaced side by side from each other by a preselected amount at forward ends thereof sufficient to allow particles up to the preselected size to pass through the fingers. Each of the finger screen means has forward ends of its fingers overlapping the next forwardly adjacent finger screen means and includes a rearwardly depending leg connected at one end to its backbone. The apparatus in which the invention is used also has the forward ends of the fingers vertically spaced above the finger screen means immediately forward thereof by an distance equal to the preselected amount of spacing between the fingers. With this arrangement, the material will be conveyed along the trough and over successive ones of the finger screen means with particles up to the preselected size falling through one of the finger screen means as the moves from the input end to the discharge end of the trough.

To accomplish the objectives of the invention, the apparatus will include means for resiliently supporting the trough relative to a supporting surface to permit vibratory movement of the trough together with means for vibrating the trough for agitating and moving the material from the input end toward the discharge agitating and moving the material from the input end toward the discharge end.

The invention is particularly useful for separating particles up to at least two distinct preselected sizes from a material having particles of a variety of different sizes therein. The apparatus then preferably includes at least two longitudinally adjacent screen regions, each of which is made up of the finger screen means, for separating the material into at least two separate batches, one of which is of substantially uniform smaller sized particles and the other of which is of substantially uniform larger sized particles. For this application, the smaller sized particles are separated from the material upstream of where the larger sized particles are separated from the material with any remaining material being discharged at the discharge end of the trough.

In the preferred embodiment, a sloping chute is suspended from below the trough for each of the longitudinally adjacent screen regions to receive particles falling therethrough. With this arrangement, a separate particle conveyor is also provided below a discharge end each of the chutes for conveying particles received in the chutes to separate destinations.

Preferably, each of the fingers of any one of the finger screen means is laterally offset so as to be aligned with a gap between a pair of the fingers of the finger screen means immediately forward thereof. It is also advantageous for the fingers of each of the finger screen means to extend forwardly and slightly upwardly relative to the backbone of the finger screen means immediately forward thereof. As for the rearwardly depending legs, they each extend rearwardly and downwardly relative to the backbone of the corresponding finger screen means to direct the particles toward one of the particle receiving chutes.

In a highly preferred embodiment, the fingers are spaced from each other by a tapering amount defining a gap diverging outwardly from the backbone to the forward ends thereof. Thus, the maximum spacing between the adjacent fingers, i.e., the spacing at the forward ends thereof, is equal to the vertical spacing or distance between the forward ends of the fingers and the finger screen means immediately forward thereof. By utilizing a diverging gap between the fingers, particles up to a preselected size are either freed to fall into a sloping chute or caused to continue to move with the material toward the discharge end of the trough.

An additional feature of the invention involves the fact that the finger screen means being connected to the trough. More specifically, the backbone of each of the finger screen means is connected directly to the trough at opposite ends thereof whereby the finger screen means are exclusively supported by the trough. In this manner, there need be no underdeck cross supports that might serve to cause hang-ups.

Still other objects, advantages and features of the invention will be apparent from the following specification taken in conjunction with the accompanying drawings.

DETAILED DESCRIPTION OF THE PREFERRED EMBODIMENTS

Figure 1:
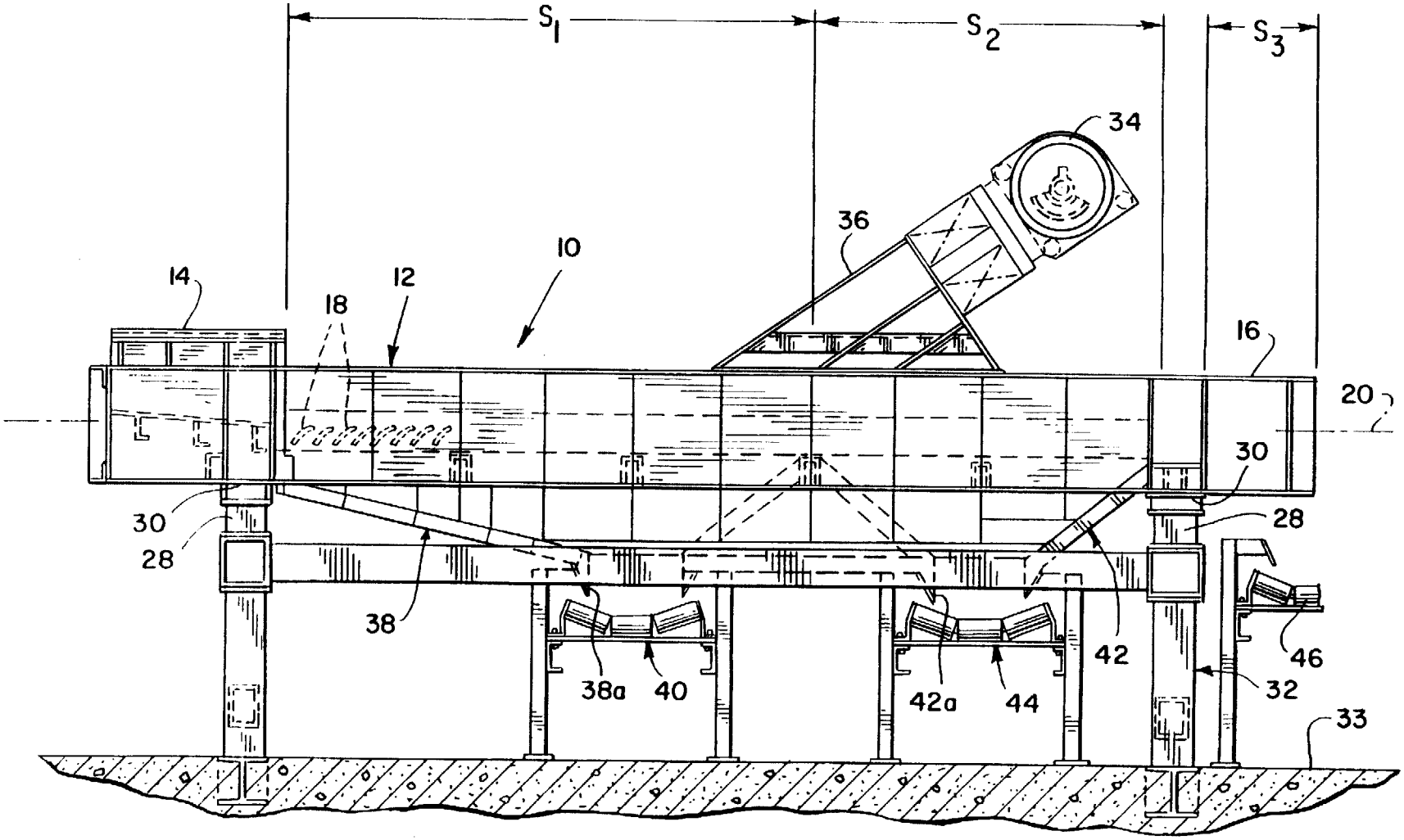
FIG. 1 is a side elevational view of a material separating apparatus according to the present invention.

Referring to the drawings, and first to FIG. 1, the reference numeral 10 designates generally a material separating apparatus in accordance with the present invention. The apparatus 10 includes a trough generally designated 12 having a material input end as at 14 longitudinally spaced from a material discharge end as at 16 together with means for separating particles up to a preselected size from a material having particles of different sizes therein. In particular, the separating means includes a plurality of finger screen means or sections 18 disposed between the input end 14 and the discharge end 16 along the longitudinal axis 20 of the trough 12.

Figure 2:
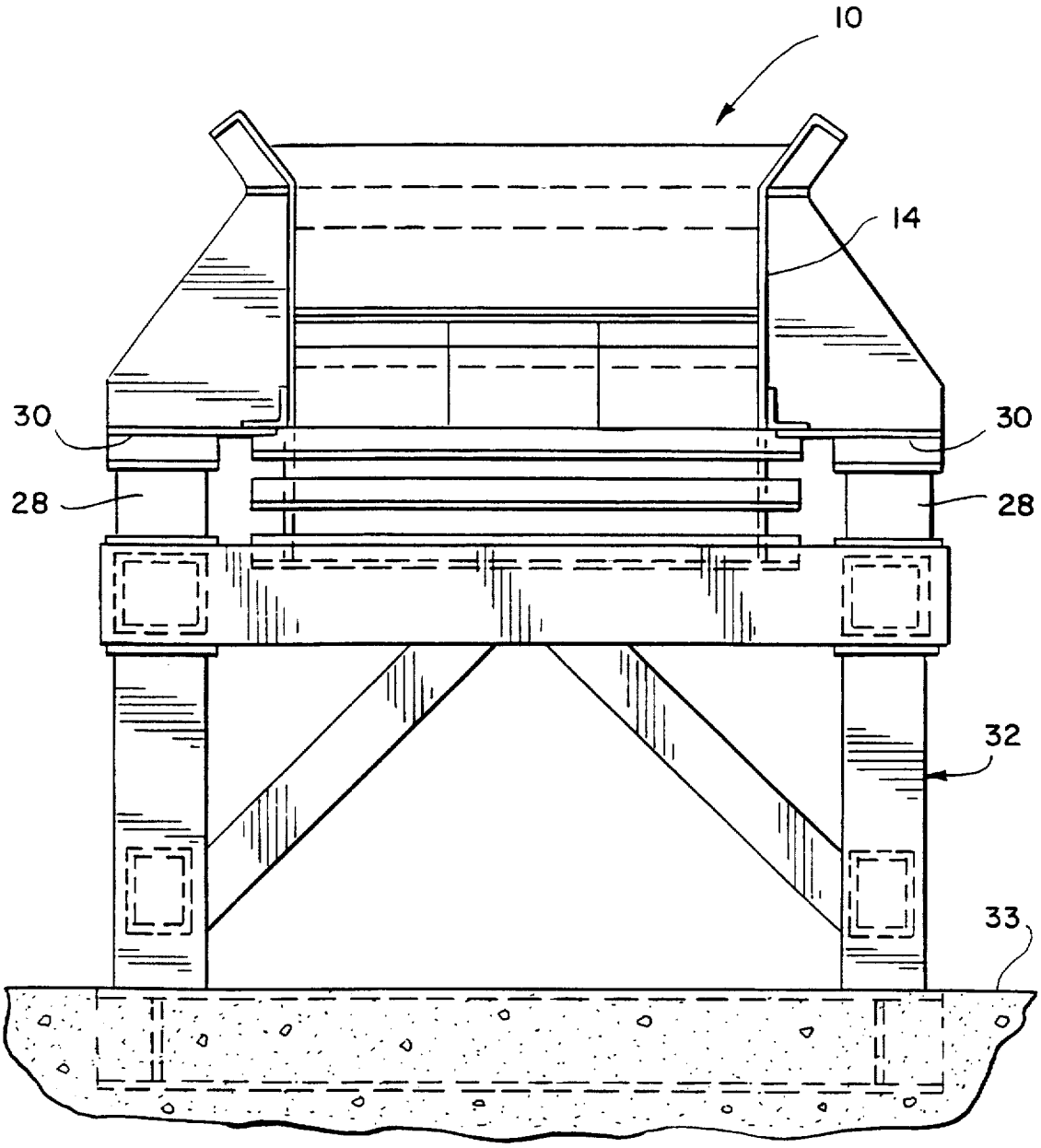
FIG. 2 is a front elevational view of the material separating apparatus of FIG. 1.
Figure 3:
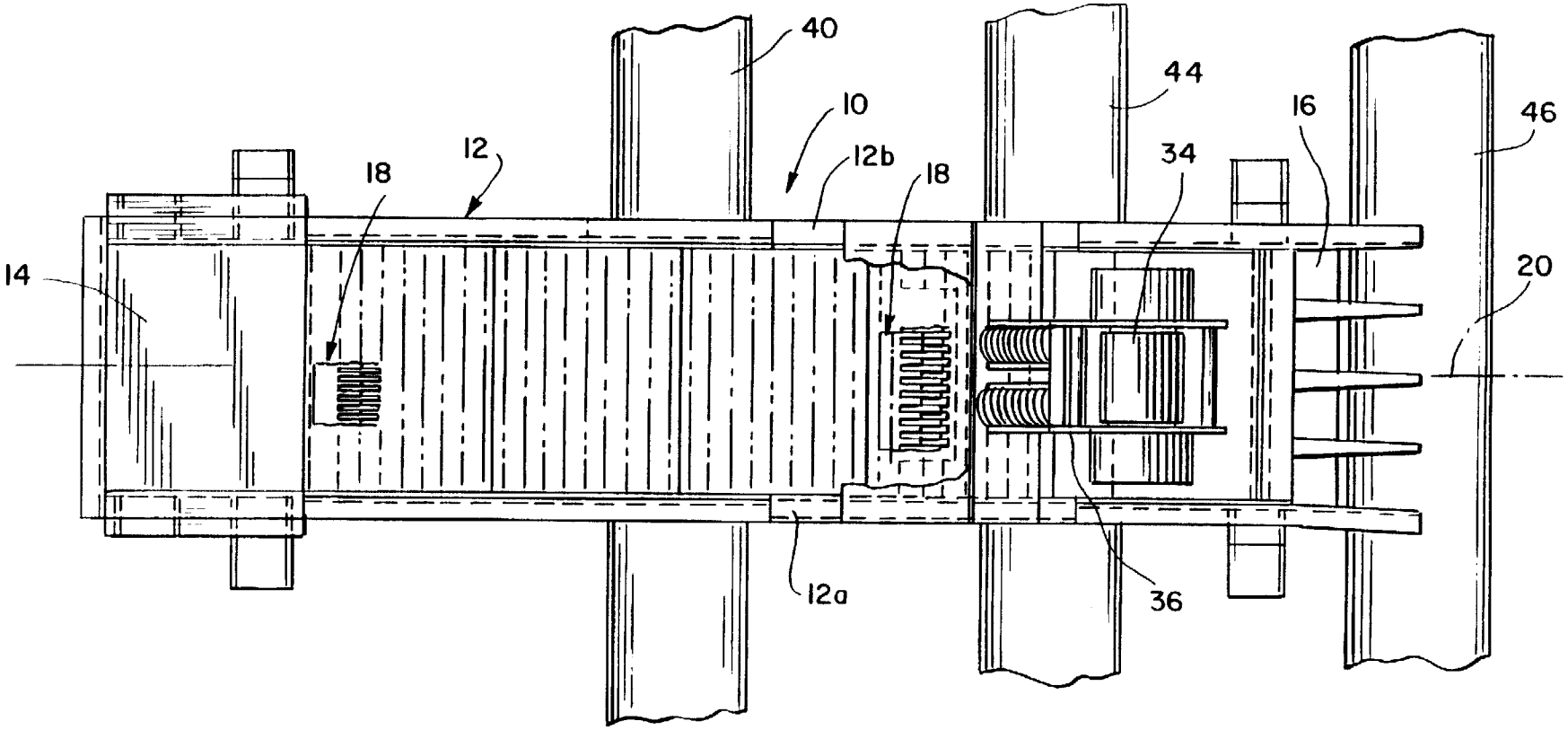
FIG. 3 is a plan view of the material separating apparatus of FIG. 1.
Figure 4:
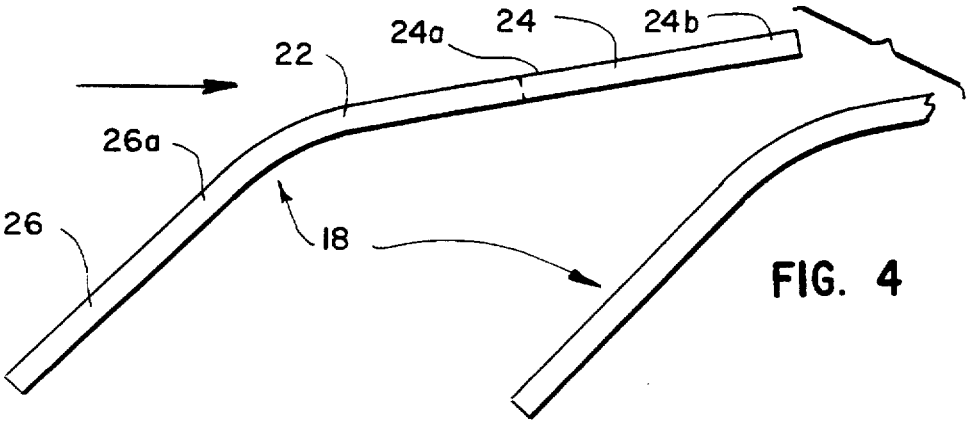
FIG. 4 is a side elevational view illustrating the a pair of longitudinally adjacent finger screen sections.
Figure 5:
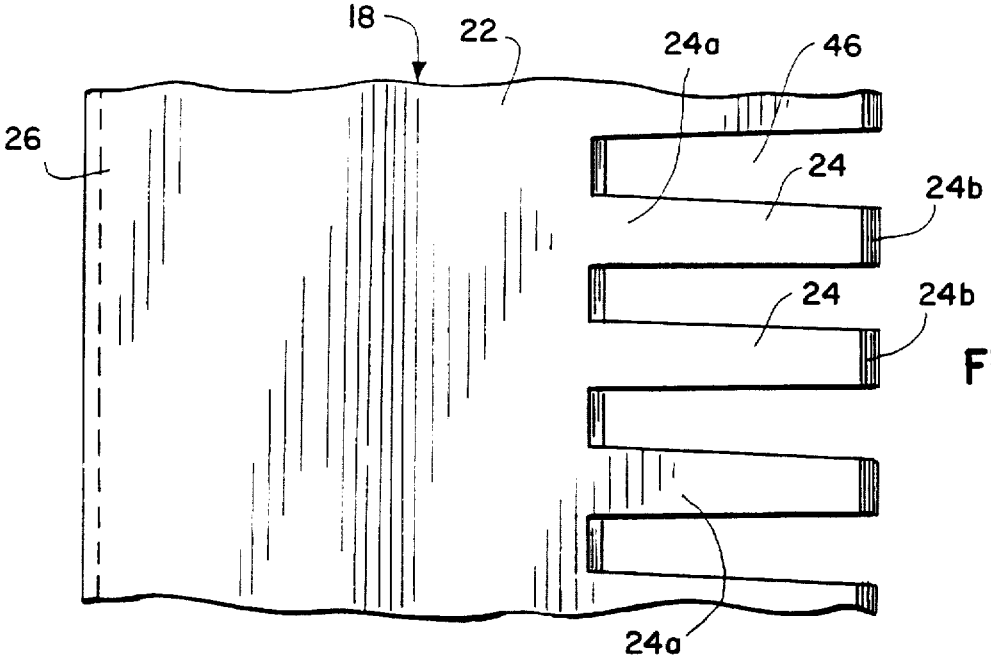
FIG. 5 is a top plan view of a single finger screen section.
Figure 6:
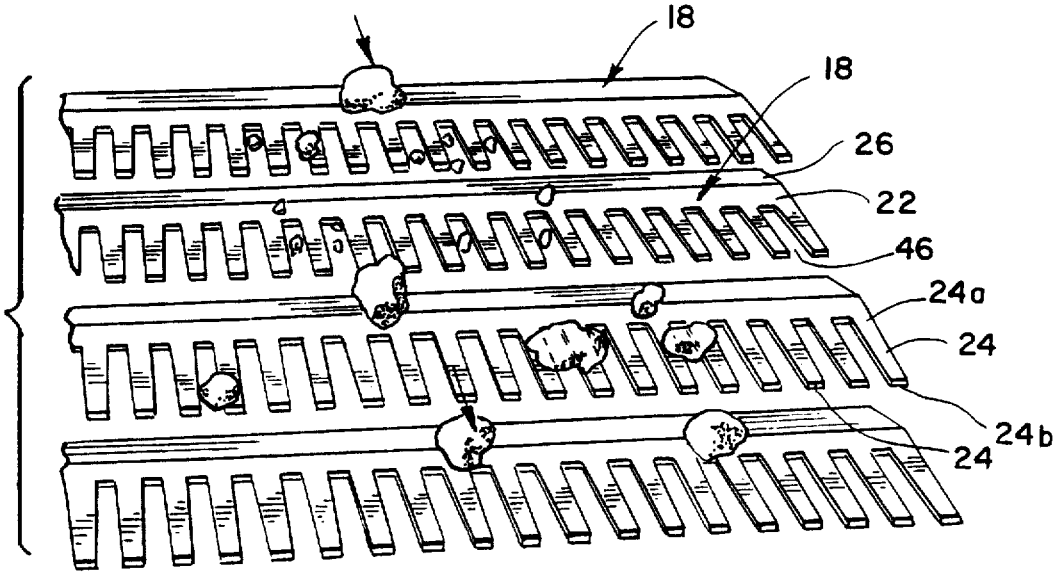
FIG. 6 is a perspective view illustrating the relationship of a plurality of finger screen sections.

Referring specifically to FIGS. 4 through 6, the finger screen sections 18 each include a backbone 22 extending from side to side across the width of the trough 12 (see, also, FIGS. 2 and 3). Each of the finger screen sections 18 also includes forwardly extending fingers 24 connected at one end 24a to the backbone 22 and spaced side by side from each other by a preselected amount at forward ends 24b thereof sufficient to allow particles up to the preselected size to pass through the fingers 24. As shown, the finger screen sections 18 also includes a rearwardly depending leg 26 connected at one end 26a to the backbone 22.

Referring to FIG. 4, the finger screen sections 18 are arranged such that the forward ends 24b of the fingers 24 overlap the finger screen section 18 immediately forward thereof. It should be noted in this connection that the forward ends 24b of the fingers 24 are vertically spaced above the next forwardly adjacent finger screen section 18 by a distance equal to the preselected amount of spacing between the fingers 24. In this manner, particles up to the preselected size will readily fall through the finger screen sections 18 as the material moves from the input end 14 to the discharge end 16 of the trough 17.

Referring to FIGS. 1 and 2, the trough 12 is resiliently supported by means of a plurality of springs 28 which are disposed between spring seats as at 30 on the bottom of the trough 12 and a tubular frame structure generally designated 32 which is secured to a supporting surface 33. In addition, the apparatus 10 includes means for vibrating the trough 12 for agitating and moving the material therealong. In this connection, the vibrating means preferably includes a high frequency vibration generator 34 mounted to the trough 12 on a supporting frame 36 so as to impart vibrational forces causing movement of the material along the longitudinal axis 20 from the input end 14 toward the discharge end 16 of the trough 12.

As will appreciated, the material will be conveyed along the trough 12 and over successive ones of the finger screen sections 18 as it moves from the input end 14 toward the discharge end 16. As the material is conveyed therealong, particles up to the preselected size, i.e., the size which corresponds to the preselected spacing between the forward ends 24b of the fingers 24 as well as the vertical spacing between the forward ends 24b of the fingers 24 and the next forwardly adjacent of the finger screen sections 18, will fall through the finger screen sections 18 into at least one sloping chute such as 38 provided for purposes of collecting and conveying the falling particles. As shown, the sloping chute 38 is suspended from below the trough 12 to receive such particles and a particle conveyor such as 40 is provided below a discharge end 38a of the chute 38 for independently conveying such particles to a separate destination.

As will be appreciated by referring to FIG. 1 finger screen sections 18 are preferably provided in at least two longitudinally adjacent screen regions $S_1$ and $S_2$ for separating the material into at least two separate batches of different sized particles. One of the batches is of substantially uniform smaller sized particles and the other of the batches is of substantially uniform larger sized particles. More specifically, the smaller sized particles are separated from the material at an upstream point, i.e., in screen region $S_1$, whereas the larger sized particles are separated from the material at a downstream point. i.e., in screen region $S_2$.

With this arrangement, it is possible to separate particles up to at least two distinct preselected sizes from a material having particles of a variety of different sizes therein. In other words, the material will be conveyed along the trough 12 and over successive ones of the finger screen sections 18. As this occurs, all of the smaller sized particles fall through the finger screen sections 18 in the upstream screen region $S_1$ while all of the larger sized particles fall through the finger screen sections 18 in the downstream screen region $S_2$.

With this arrangement, there will be sloping chutes 38 and 42 suspended from below the trough 12 in longitudinally spaced relationship for each of the screen regions $S_1$ and $S_2$. These sloping chutes will receive particles falling through the finger screen sections 18 in the respective screen regions $S_1$ and $S_2$. Further, there will be separate particle conveyors 40 and 44 below discharge ends 38a and 42a for independently conveying particles received from each of the chutes 38 and 42 to separate destinations.

Referring to FIGS. 5 and 6, it will be seen that the fingers 24 are spaced from each other by a tapering amount defining a gap 46 diverting outwardly from the backbone 22 to the forward ends 24b thereof. It will also be appreciated by referring specifically to FIG. 6 and also FIG. 3, that the fingers 24 of any one of the finger screen sections 18 are laterally offset so as to be aligned with the gap 46 between a pair of the fingers 24 of the finger screen section 18 immediately forward thereof. In other words, the fingers 24 of adjacent ones of the finger screen sections 18 are staggered in a manner making it possible to eliminate material "bypass".

As will be appreciated by referring to FIGS. 1 through 3, the finger screen sections 18 are each connected to and exclusively supported by opposite sides 12a and 12b of the trough 12. More specifically, the finger screen sections 18 are so connected at opposite ends of the backbone 22 thereof. By so configuring and securing the finger screen sections 18, it is possible to avoid underdeck cross supports that might otherwise be capable of causing hang-ups.

As best shown in FIG. 4, the rearwardly depending leg 26 of each of the finger screen sections 18 extends rearwardly and downwardly relative to the backbone 22 which causes particles to be directed toward one of the particle receiving chutes 38 and 42. As also shown in FIG. 4, the fingers 24 of each of the finger screen sections 18 extend forwardly and slightly upwardly relative to the backbone 22 of the finger screen section 18 immediately forward thereof.

With this arrangement unique arrangement of finger screen sections 18, the present invention has provided what can be characterized as a "cascading action finger-screen."

While not previously mentioned, the forward ends 24b of adjacent ones of the fingers 24 are spaced apart by an equal amount for all of the finger screen sections 18 in any one of the separate screen regions such as $S_1$ and $S_2$ (see FIGS. 1 and 6). The degree of separation, as previously mentioned, is the same as the vertical spacing between the forward ends 24b of the fingers 24 and the next sections 18. With this arrangement, there are unobstructed openings to allow "free fall" of the appropriately sized particles as the material is conveyed from the input end 14 toward the discharge end 16 of the trough 12.

Referrings to FIGS. 1 and 3, the material separating apparatus 10 is particularly well suited for separating plural sized particles into at least two batches of particles. It will be appreciated that the plural sized particles comprise a material to be classified by size. In this connection, one of the batches of particles will contain particles up to a first preselected size and another of the batches of particles will contain particles up to a second preselected size.

With this understanding, the fingers 24 are spaced side by side from each other by a first (smaller) preselected amount at forward ends 24b of the first, upstream screen regions $S_1$ of finger screen sections 18 sufficient to allow particles up to the first preselected size to pass through the fingers 24 thereof. In like fashion, the fingers 24 are spaced side by side from each other by a second (larger) amount at forward ends 24b of the section, downstream screen region $S_2$ of finger screen sections 18 sufficient to allow particles up to the second preselected size to pass through the fingers 24 thereof.

As a result, the material having plural sized particles will be conveyed along the trough and over successive ones of the finger screen sections 18 with particles up to the first preselected size falling through the finger screen sections 18 of the first, upstream screen section $S_1$, particles up to the second preselected size falling through the second, downstream screen region $S_2$, and particles larger than the second preselected size being discharged from the discharge end 16 of the trough 12 onto a material conveyor 46 as the material moves from the input end 14 to the discharge end 16 of the trough 12.

With this understanding of the invention, the material separating apparatus is a non-bending, self-relieving design which stays clean without "porcupining." The diverging gaps between fingers which gradually increase in width free on-size pieces to allow them to drop through or continue to be conveyed, and the design of the fingers provides a "camming" action for longer pieces which will not completely pass through thereby avoiding wedging. Moreover, modular self-contained sections are utilized for quick and easy replacement, the apparatus can be custom built in a variety of sizes and materials, and multiple size particle separation can be accomplished on a single deck While in the foregoing there has been set forth a preferred embodiment of the invention, it will be understood that the details herein given are for purposes of illustration only and the invention is to be limited solely by the spirit and scope of the appended claims.

I/we claim:

1. A material separating apparatus, comprising:

a trough having a material input end longitudinally spaced from a material discharge end and including means for separating particles up to a preselected size from a material having particles of different sizes therein; and means for resiliently supporting said trough relative to a supporting surface to permit vibratory movement of said trough and means for vibrating said trough for agitating and moving said material from said input end toward said discharge end;

said separating means including a plurality of longitudinally spaced finger screen means disposed between said input end and said discharge end and along the longitudinal axis of said trough, each of said finger screen means including a backbone extending from side to side across the width of said trough, each of said finger screen means also including forwardly extending fingers connected at one end to said backbone, said fingers being spaced side by side from each other by a preselected amount at forward ends thereof sufficient to allow particles up to said preselected size to pass through said fingers, said fingers of each of said finger screen means extending forwardly and slightly upwardly relative to said backbone of said finger screen means immediately forward thereof, each of said finger screen means also including a rearwardly depending leg connected at one end to said backbone, each of said finger screen means having said forward ends of said fingers overlapping said finger screen means immediately forward thereof, said forward ends of said fingers being vertically spaced above said finger screen means adjacent to and immediately forward thereof by a spacing [sufficient to permit particles up] *equal* to said preselected [size to pass through the] *amount of* spacing between adjacent ones of said finger screen means;

whereby said material having particles of different sizes will be conveyed along said trough and over successive ones of said finger screen means with particles up to said preselected size falling through said finger screen means as said material moves from said input end to said discharge end of said trough.

2. The material separating apparatus as defined in claim 1 including at least one sloping chute suspended from below said trough for receiving particles falling through said finger screen means.

3. The material separating apparatus as defined in claim 2 including a particle conveyor below a discharge end of said chute for independently conveying particles received from said chute to a separate destination.

4. The material separating apparatus as defined in claim 1 wherein said finger screen means includes at least two longitudinally adjacent screen regions for separating said material into at least two separate batches.

5. The material separating apparatus as defined in claim 4 wherein one of said batches is of substantially uniform smaller sized particles and the other of said batches is of substantially uniform larger sized particles.

6. The material separating apparatus as defined in claim 5 wherein said smaller sized particles are separated from said material upstream of where said larger sized particles are separated from said material.

7. The material separating apparatus as defined in claim 1 wherein said fingers of one of said finger screen means are laterally offset relative to said fingers of said finger screen means immediately forward thereof.

8. The material separating apparatus as defined in claim 1 wherein said finger screen means are each connected to and exclusively supported by said trough at opposite ends of said backbone thereof.

9. A material separating apparatus, comprising:

a trough having a material input end longitudinally spaced from a material discharge end and including means for separating particles up to at least two distinct preselected sizes from a material having particles of a variety of different sizes therein; and means for resiliently supporting said trough relative to a supporting surface to permit vibratory movement of said trough and means for vibrating said trough for agitating and moving said material from said input end toward said discharge end;

said separating means including a plurality of longitudinally spaced finger screen means disposed between said input end and said discharge end and along the longitudinal axis of said trough, each of said finger screen means also including a backbone extending from side to side across the width of said trough, each of said finger screen means also including means being formed such that said fingers are all tapered to define gaps diverting outwardly from said backbone to said forward ends of said fingers where said gaps are a preselected amount sufficient to allow particles up to one of said preselected sizes to pass through said fingers, each of said finger screen means also including a rearwardly depending leg connected at one end to said backbone, each of said finger screen means having said forward ends of said fingers overlapping said finger screen means immediately forward thereof, said forward ends of said fingers being vertically spaced above said finger screen means immediately forward thereof by a distance equal to said preselected amount of spacing between adjacent fingers;

said finger screen means including at least two longitudinally adjacent screen regions for separating said material into at least two separate batches, one of said batches being of substantially uniform smaller sized particles and the other of said batches being of substantially uniform larger sized particles, said smaller sized particles being separated from said material upstream of where said larger sized particles are separated from said material, whereby said material having particles of a variety of different sizes will be conveyed along said trough and over successive ones of said finger screen means with said smaller sized particles falling through an upstream one of said screen regions and said larger sized particles falling through a downstream one of said screen regions as said material moves from said input end to said discharge end of said trough.

10. The material separating apparatus as defined in claim 9 including a sloping chute suspended from below said trough in longitudinally spaced relationship for each of said screen regions for receiving particles falling through each of said screen regions.

11. The material separating apparatus as defined in claim 10 including a separate particle conveyor below a discharge end of each of said chutes for independently conveying particles received from each of said chutes to a separate destination.

12. The material separating apparatus as defined in claim 9 wherein each of said fingers of any one of said finger screens means is laterally offset so as to be aligned with said gap between a pair of said fingers of said finger screen means immediately forward thereof.

13. The material separating apparatus as defined in claim 9 wherein said rearwardly depending leg of each of said finger screen means extends rearwardly and downwardly relative to said backbone to direct said particles toward a particle receiving chute.

14. The material separating apparatus as defined in claim 9 wherein said fingers of each of said finger screen means extend forwardly and slightly upwardly relative to said backbone of said finger screen means immediately forward thereof.

15. The material separating apparatus as defined in claim 9 wherein said forward ends of adjacent ones of said fingers are spaced apart by an equal amount for all of said finger screen means in any one of said separate screen regions.

16. A material separating apparatus, comprising:

a trough having a material input end longitudinally spaced from a material discharge end and including means for separating plural sized particles into at least two batches of particles, said plural sized particles comprising a material to be classified by size, one of said batches of particles containing particles up to a first preselected size and another of said batches of particles containing particles up to a second preselected size; and means for resiliently supporting said trough relative to a supporting surface to permit vibratory movement of said trough and means for vibrating said trough for agitating and moving said material from said input end toward said discharge end;

said separating means including a plurality of longitudinally spaced finger screen means disposed between said input end and said discharge end and along the longitudinal *axis of said trough, each of said finger screen means* including a backbone extending from side to side across the width of said trough, each of said finger screen means also [axis of said trough, each of said finger screen means also] including forwardly extending fingers connected at one end to said backbone, each of said finger screen means being formed such that said fingers are all tapered to define gaps diverging outwardly to a first preselected amount of spacing at forward ends of said fingers of a first, upstream screen region sufficient to allow particles up to said first preselected sizes to pass through said fingers thereof and by a second preselected amount of spacing at forward ends of said fingers of a second, downstream screen region sufficient to allow particles up to said second preselected size to pass through said fingers thereof, each of said finger screen means also including a rearwardly depending leg connected at one end to said backbone, each of said finger screen means having said forward ends of said fingers overlapping said finger screen means immediately forward thereof, said forward ends of said fingers being vertically spaced above said finger screen means immediately forward thereof by a distance equal to said preselected amount of spacing between adjacent fingers;

whereby said material having plural sized particles will be conveyed along said trough and over successive ones of said finger screen means with particles up to said first preselected size falling through said finger screen means of said first, upstream screen region, particles up to said second preselected size falling through said second, downstream screen region and particles larger than said second preselected size being discharged from said discharge end of said trough as said material moves from said input end to said discharge end of said trough.

17. The material separating apparatus as defined in claim 16 wherein said finger screen means are each connected to and exclusively supported by said trough at opposite ends of said backbone thereof.

18. The material separating apparatus as defined in claim 16 including a sloping chute suspended from below said trough in longitudinally spaced relationship for each of said screen regions for receiving particles falling through said finger screen means.

19. The material separating apparatus as defined in claim 18 including a separate particle conveyor below a discharge end of each of said chutes for independently conveying particles received from each of said chutes to a separate destination.

20. The material separating apparatus as defined in claim 16 wherein each of said fingers of said finger screen means is laterally offset in alignment with a gap between a pair of said fingers of said finger screen means immediately forward thereof.

21. The material separating apparatus as defined in claim 16 wherein said fingers of each of said finger screen means extend forwardly and slightly upwardly relative to said backbone of said finger screen means immediately forward thereof.

* * * * *